United States Patent
Kuraki et al.

(10) Patent No.: US 9,468,891 B2
(45) Date of Patent: Oct. 18, 2016

(54) METHOD FOR PRODUCING MICROPARTICLES

(75) Inventors: Jun Kuraki, Izumi (JP); Kaeko Araki, Izumi (JP); Masaki Maekawa, Izumi (JP); Daisuke Honda, Izumi (JP); Masakazu Enomura, Izumi (JP)

(73) Assignee: M. TECHNIQUE CO., LTD., Izumi-Shi (JP)

( * ) Notice: Subject to any disclaimer, the term of this patent is extended or adjusted under 35 U.S.C. 154(b) by 201 days.

(21) Appl. No.: 14/005,506

(22) PCT Filed: Mar. 21, 2012

(86) PCT No.: PCT/JP2012/057125
§ 371 (c)(1),
(2), (4) Date: Sep. 16, 2013

(87) PCT Pub. No.: WO2012/128273
PCT Pub. Date: Sep. 27, 2012

(65) Prior Publication Data
US 2014/0001663 A1 Jan. 2, 2014

(30) Foreign Application Priority Data

Mar. 23, 2011 (JP) ................................. 2011-065088

(51) Int. Cl.
*B01F 3/22* (2006.01)
*B01F 7/00* (2006.01)
*B01J 19/10* (2006.01)
*B01J 19/18* (2006.01)
(Continued)

(52) U.S. Cl.
CPC .............. *B01F 3/22* (2013.01); *B01F 7/00775* (2013.01); *B01F 7/00791* (2013.01); *B01F 13/1027* (2013.01); *B01J 19/10* (2013.01); *B01J 19/1806* (2013.01); *B01J 19/1875* (2013.01); *B01J 19/1887* (2013.01); *B01J 19/20* (2013.01); *B82Y 30/00* (2013.01); *C01G 9/02* (2013.01); *B01F 2215/0481* (2013.01); *B01J 2219/00779* (2013.01); *C01P 2004/54* (2013.01); *C01P 2004/64* (2013.01)

(58) Field of Classification Search
None
See application file for complete search history.

(56) References Cited

U.S. PATENT DOCUMENTS 5,037,864 A * 8/1991 Anand ............... C08G 18/0804
523/348
6,290,386 B1 * 9/2001 Baumgartl .......... B01F 15/0201
366/155.1

(Continued)

FOREIGN PATENT DOCUMENTS

CN 1418081 A 5/2003
CN 1483515 A 3/2004
(Continued)

*Primary Examiner* — Ryan Ochylski
(74) *Attorney, Agent, or Firm* — Birch, Stewart, Kolasch & Birch, LLP

(57) ABSTRACT

The problem addressed by the present invention is to provide a method for producing microparticles. Provided is a method that is for producing microparticles and that is characterized by containing at least the following two steps: (I) a step for preparing a microparticle starting material solution by dissolving at least one type of microparticle starting material in a solvent using high speed stirring or ultrasonic waves, and (II) a step for precipitating microparticles by mixing the microparticle starting material solution and at least one type of precipitation solvent for precipitating the microparticle starting material in a thin film fluid formed between at least two processing surfaces that are disposed facing each other, are able to approach/separate from each other, and of which at least one rotates relative to the others.

8 Claims, 5 Drawing Sheets

(51) Int. Cl.
*B01J 19/20* (2006.01)
*B82Y 30/00* (2011.01)
*C01G 9/02* (2006.01)
*B01F 13/10* (2006.01)

(56) References Cited

U.S. PATENT DOCUMENTS

| | | |
|---|---|---|
| 2003/0021839 A1 | 1/2003 | Draisey |
| 2004/0032792 A1 | 2/2004 | Enomura |
| 2010/0155310 A1 | 6/2010 | Enomura |
| 2010/0196788 A1* | 8/2010 | Enomura ............ B01F 7/00775 429/483 |

FOREIGN PATENT DOCUMENTS

| | | | |
|---|---|---|---|
| CN | 101795772 A | | 8/2010 |
| JP | 6-285346 A | | 10/1994 |
| JP | 10046565 A | * | 2/1998 |
| JP | 11-347388 A | | 12/1999 |
| JP | 11333275 A | * | 12/1999 |
| JP | 2001-149764 A | | 6/2001 |
| JP | 2002-97281 A | | 4/2002 |
| JP | 2006-193652 A | | 7/2006 |
| JP | 2006-221023 A | | 8/2006 |
| WO | WO 2009/008393 A1 | | 1/2009 |

* cited by examiner (A)

(B)

(A)

(B)

METHOD FOR PRODUCING MICROPARTICLES

The present invention relates to a method for producing microparticles.

Microparticles of a metal, an oxide, a medicine, a food stuff, a biological ingesting material such as a cosmetic, a pigment, and so on are wanted in a wide range of the industrial field.

In a general method for producing microparticles, a poor solvent method, crystallization, or a reaction such as oxidation and reduction is carried out by using a flask, a beaker, a tank, and the like as described in Patent Document 1. However, when vessels like these are used, it is difficult to keep concentration and temperature uniformly in the vessels so that the particle diameter distribution of the obtained microparticles tends to be broad; and in the case of microparticles containing two or more elements, such as a metal alloy and a composite oxide, it has been difficult to produce microparticles having a uniform element ratio. Alternatively, a method for producing microparticles which uses a microreactor as described in Patent Document 2 is provided; however, under the current situation, a general microreactor still has many problems to be solved, such as clogging by a reacted material and difficulty in up-scaling. In view of the above situation, a method for producing homogeneous and uniform microparticles stably and with a low energy and a low cost has been eagerly wanted.

By Applicant of the present invention, a method for producing microparticles, such as those described in Patent Document 3, was provided in which a microparticle raw material solution having a microparticle raw material dissolved therein is mixed with a separating solution to separate the said microparticles in a thin film fluid formed between at least two processing surfaces which are disposed in a position they are faced with each other so as to be able to approach to and separate from each other, at least one of which rotates relative to the other.

However, even in the case that a method described in Patent Document 3 is used, there has been a certain instance that microparticles cannot be produced stably; and in the case that microparticles containing two or more molecules or elements are produced, there has been a certain instance that to produce homogeneous and uniform microparticles is difficult because of a local variance in the ratio of these elements.

PRIOR ART DOCUMENTS

Patent Document

Patent Document 1: Japanese Laid-Open Publication No. 2002-97281
Patent Document 2: Japanese Laid-Open Publication No. 2006-193652
Patent Document 3: International Patent Laid-Open Publication No. 2009/008393

DISCLOSURE OF INVENTION

Problems to be Solved by the Invention

The present invention is made to solve the problems as mentioned above; and thus, the object thereof is to provide a method for producing microparticles.

Means for Solving the Problems

Inventors of the present invention carried out an extensive investigation, and as a result, during the time to separate microparticles by mixing a microparticle raw material solution having a microparticle raw material dissolved therein with a separating solution to separate the microparticles in a thin film fluid formed between at least two processing surfaces which are disposed in a position they are faced with each other so as to be able to approach to and separate from each other, at least one of which rotates relative to the other, they found that, if the said microparticle raw material solution is prepared by a high speed agitation or an ultrasonic wave, intended microparticles can be produced stably and that more homogenous and uniform microparticles than ever can be produced even in the case of microparticles containing two or more elements or molecules; and based on this finding, they completed the present invention.

The invention according to claim 1 of the present application provides a method for producing microparticles, wherein the method comprises at least two following steps:

(I) a step of preparing a microparticle raw material solution by dissolving at least one microparticle raw material in a solvent by using a high speed agitation and (II) a step of mixing the said microparticle raw material solution with at least one separating solution to separate the said microparticle raw material in a thin film fluid formed between at least two processing surfaces which are disposed in a position they are faced with each other so as to be able to approach to and separate from each other, at least one of which rotates relative to the other, thereby separating the microparticles.

The invention according to claim 2 of the present application provides the method for producing microparticles according to claim 1, wherein peripheral velocity of an agitating blade during the time of dissolving the microparticle raw material into the solvent by using the high speed agitation is 1 or more by m/second.

The invention according to claim 3 of the present application provides a method for producing microparticles, wherein the method comprises at least two following steps:

(I) a step of preparing a microparticle raw material solution by dissolving at least one microparticle raw material in a solvent by using an ultrasonic wave and (II) a step of mixing the said microparticle raw material solution with at least one separating solution to separate the said microparticle raw material in a thin film fluid formed between at least two processing surfaces which are disposed in a position they are faced with each other so as to be able to approach to and separate from each other, at least one of which rotates relative to the other, thereby separating the microparticles.

The invention according to claim 4 of the present application provides the method for producing microparticles according to claim 1 or 3, wherein particle diameter of the microparticles to be separated is controlled by preparing the microparticle raw material solution by using a high speed agitation or an ultrasonic wave.

According to a mere one embodiment of the present invention shown above, this method can be executed as the method for producing microparticles, wherein at least two fluids to be processed are used,
of them, at least one fluid to be processed is the microparticle raw material solution and
at least one fluid to be processed other than the microparticle raw material solution is the separating solvent, wherein provided therewith are:
a fluid pressure imparting mechanism for imparting a pressure to the fluids to be processed,
a first processing member arranged with a first processing surface of the at least two processing surfaces, a second processing member arranged with a second processing surface of the at least two processing surfaces, and a rotation drive mechanism for rotating these processing members relative to each other, wherein each of the processing surfaces constitutes part of a closed flow path through which the fluids to be processed under the pressure is passed, of the first processing member and the second processing member, at least the second processing member is provided with a pressure-receiving surface, and at least part of the pressure-receiving surface is comprised of the second processing surface, wherein this pressure-receiving surface receives a pressure applied to the fluids to be processed by the fluid pressure imparting mechanism thereby generating a force to move in the direction of separating the second processing surface from the first processing surface, and the fluids to be processed under the pressure are introduced into between the first processing surface and the second processing surface which are disposed in a position they are faced with each other so as to be able to approach to and separate from each other, at least one of which rotates relative to the other thereby forming the thin film fluid by the fluids to be processed, thereby separating the microparticles in this thin film fluid According to a mere one embodiment of the foregoing present invention, this method can be executed as the method for producing microparticles, wherein of the fluids to be processed, at least any one of the fluids passes through between the processing surfaces while forming the thin film fluid, at least one separate introduction path independent of a flow path through which the anyone of the fluids to be processed passes is arranged, at least one opening which leads to the introduction path is provided to at least any one of the first processing surface and the second processing surface, at least one fluid which is different from the at least any other one of the fluids is introduced between the processing surfaces through the opening, whereby mixing these fluids to be processed in the thin film fluid, thereby separating the microparticles in this thin film fluid.

Advantages

According to the present invention, uniform and homogeneous microparticles can be produced with more conveniently and with a lower energy and cost than ever; and thus, the microparticles can be provided cheaply and stably. In addition, microparticles in accordance with the intended purpose can be provided, because particles diameter thereof can be controlled readily.

Figure 1:
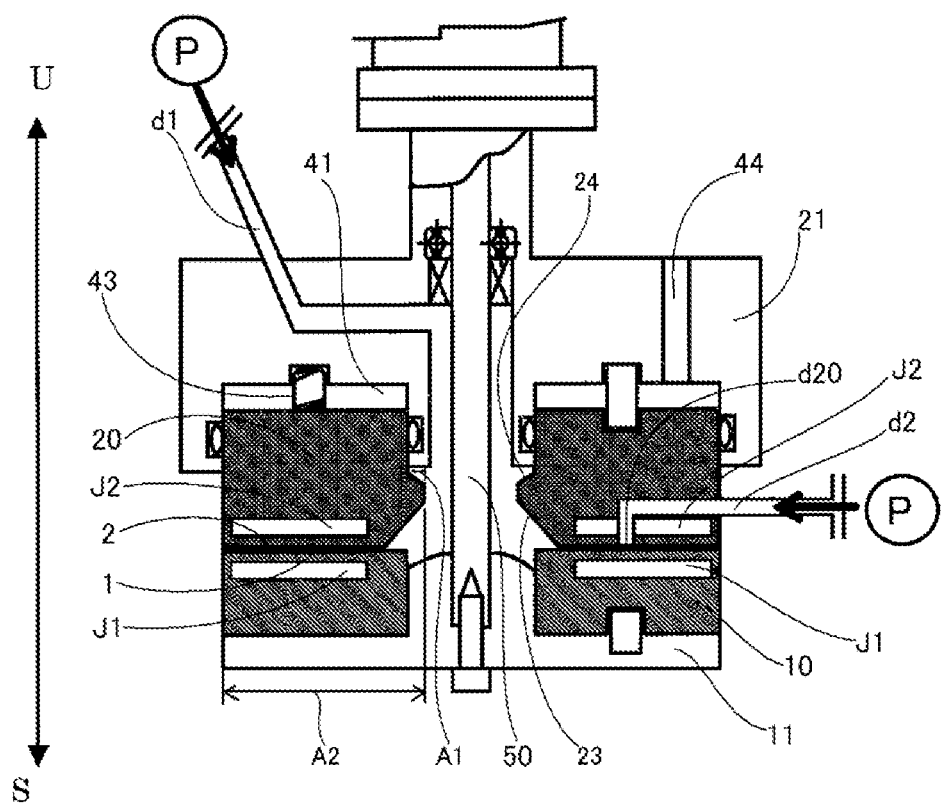
FIG. 1 is a schematic sectional view showing the fluid processing apparatus according to an embodiment of the present invention.

Hereinafter, detailed explanation of the present invention will be made; but a technical range of the present invention is not limited by the following Embodiments and Examples.

In the present invention, there is no particular restriction as to the kind of the microparticles. One example thereof includes an organic substance, an inorganic substance, and a composite substance of an organic substance and an inorganic substance. The other example includes a metal and/or a non-metal, and a compound of them. Although there is no particular restriction as to the compound of a metal and/or a non-metal, one example thereof includes a metal or a non-metal in the form of a salt, an oxide, a hydroxide, a hydroxylated oxide, a nitride, a carbide, a complex, an organic salt, an organic complex, an organic compound, and a hydrate and an organic solvent adduct of them. Although not particularly restricted, included are a nitrate salt, a nitrite salt, a sulfate salt, a sulfite salt, a formate salt, an acetate salt, a phosphate salt, a phosphite salt, a hypophosphite salt, a chloride, an oxy salt, an acetylacetonato salt of a metal or non-metal, and a hydrate and an organic solvent adduct of them.

In the present invention, a poor solvent method to precipitate or separate the above-mentioned microparticles or a reaction such as an oxidation reaction and a reducing reaction is carried out in a thin film fluid formed between at least two processing surfaces which are disposed in a position they are faced with each other so as to be able to approach to and separate from each other, at least one of which rotates relative to the other, so that the microparticles can be produced. Specifically, a microparticle raw material solution having a microparticle raw material of intended microparticles mixed with or dissolved in a solvent is mixed with a separating solution to separate the said microparticle raw material between at least two processing surfaces which are disposed in a position they are faced with each other so as to be able to approach to and separate from each other, at least one of which rotates relative to the other, thereby separating the microparticles.

As to the microparticle raw material in the present invention, the same material as the microparticles mentioned above may be used. The microparticle raw material solution in the present invention is prepared by mixing or dissolving at least one microparticle raw material in a solvent (hereinafter, this procedure is merely described as "dissolution"). Preferably, the present invention is carried out by dissolving or molecular dispersing at least one microparticle raw material into a solvent.

An illustrative example of the solvent to dissolve the microparticle raw material includes water, an organic solvent, or a mixed solvent comprising a plurality of them. An illustrative example of the water includes tap water, ion-exchanged water, pure water, ultrapure water, and RO water. An illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogen-containing compound solvent, an ester compound solvent, an ionic liquid, a carboxylic acid compound, and a sulfonic acid compound. These solvents may be used separately or as a mixture of a plurality of them.

Alternatively, the present invention may be carried out by mixing or dissolving a basic substance or an acidic substance in the above-mentioned solvent. Illustrative example of the basic substance includes a metal hydroxide such as sodium hydroxide and potassium hydroxide, a metal alkoxide such as sodium methoxide and sodium isopropoxide, and an amine compound such as triethylamine, 2-diethylaminoethanol, and diethylamine. Illustrative example of the acidic substance includes an inorganic acid such as aqua regia, hydrochloric acid, nitric acid, fuming nitric acid, sulfuric acid, and fuming sulfuric acid; and an organic acid such as formic acid, acetic acid, chloroacetic acid, dichloroacetic acid, oxalic acid, trifluoroacetic acid, and trichloroacetic acid. These basic substances or acidic substances may be respectively used solely or as a mixture with the foregoing solvents.

Alternatively, the present invention may be carried out by mixing or dissolving an oxidizing agent or a reducing agent in the above-mentioned solvents. Although there is no particular restriction as to the oxidizing agent, illustrative example thereof includes a nitrate salt, hypochlorite salt, a permanganate salt, and a peroxide. Illustrative example of the reducing agent includes aluminum lithium hydride, sodium borohydride, a hydrazine, a hydrate of hydrazine, a sulfite ion, and a metal ion—especially a transition metal ion (such as an iron ion and a titanium ion).

As to the separating solvent to separate the microparticle raw material by mixing with the above-mentioned microparticle raw material solution, the same solvent as those mentioned before may be used. With regard to the solvent to dissolve the raw material and the solvent to separate it, the present invention may be carried out by appropriate selecting the solvent for dissolution and the solvent for separation in accordance with the intended microparticles.

In the present invention, the microparticle raw material solution is prepared preferably by using a high speed agitator. Specifically, a high speed agitator is used when a microparticle raw material is dissolved in the solvent. By so doing, not only generation of coarse particles caused by undissolved matters in the microparticle raw material solution can be suppressed as a matter of course, but also the microparticle raw material solution in the state of more uniform dissolution can be obtained promptly even in the case of dissolving two or more molecules or elements. Accordingly, even in the case that microparticles are separated in the thin film fluid formed between at least two processing surfaces which are disposed in a position they are faced with each other so as to be able to approach to and separate from each other, at least one of which rotates relative to the other, it became possible to produce the microparticles that are more uniform and homogeneous than ever.

Agitation and mixing by using a general stirring bar for a long period of time is not desirable because there occurs a problem such as partial decomposition of a molecule or an ion contained in the microparticle raw material; but this does not restrict the time for agitation using the high speed agitator in the present invention.

A method for the high speed agitation in the present invention is not particularly restricted; the present invention may be carried out by using an agitating machine, a dissolving machine, an emulsifying machine, a dispersing machine, homogenizer, and so on with various types such as a shearing type, a friction type, a high pressure jet type, and a ultrasonic wave type. Illustrative example thereof includes a continuous emulsifying machine such as Uraltra Turrax (manufactured by IKA WORKS, Inc.), Polytron (manufactured by Kinematica AG.), TK Homomixer (manufactured by Primix Corp.), Ebara Milder (manufactured by Ebara Corp.), TK Homomicline Flow (manufactured by Primix Corp.), Colloid Mill (manufactured by Shinko Pantec Co., Ltd.), Slasher (manufactured by Nippon Cokes Industries Co., Ltd.), Trigonal Wet Pulverizer (manufactured by Mitsui Miike Machinery Co., Ltd.), Cavitron (manufactured by Eurotec Co., Ltd.), and Fine Flow Mill (manufactured by Pacific Machinery & Engineering Co., Ltd.); and a batch or a continuous dual emulsification machine such as Clearmix (manufactured by M. Technique Co., Ltd.), Clearmix Dissolver (manufactured by M. Technique Co., Ltd.), and Filmix (manufactured by Primix Corp.). It is also possible to prepare the microparticle raw material solution by using an ultrasonic homogenizer or an ultrasonic cleaning machine.

As discussed above, the high speed agitation may be done by using various embodiments; and here, one example thereof will be explained by referring to FIG. 4 and FIG. 5.

Figure 4:
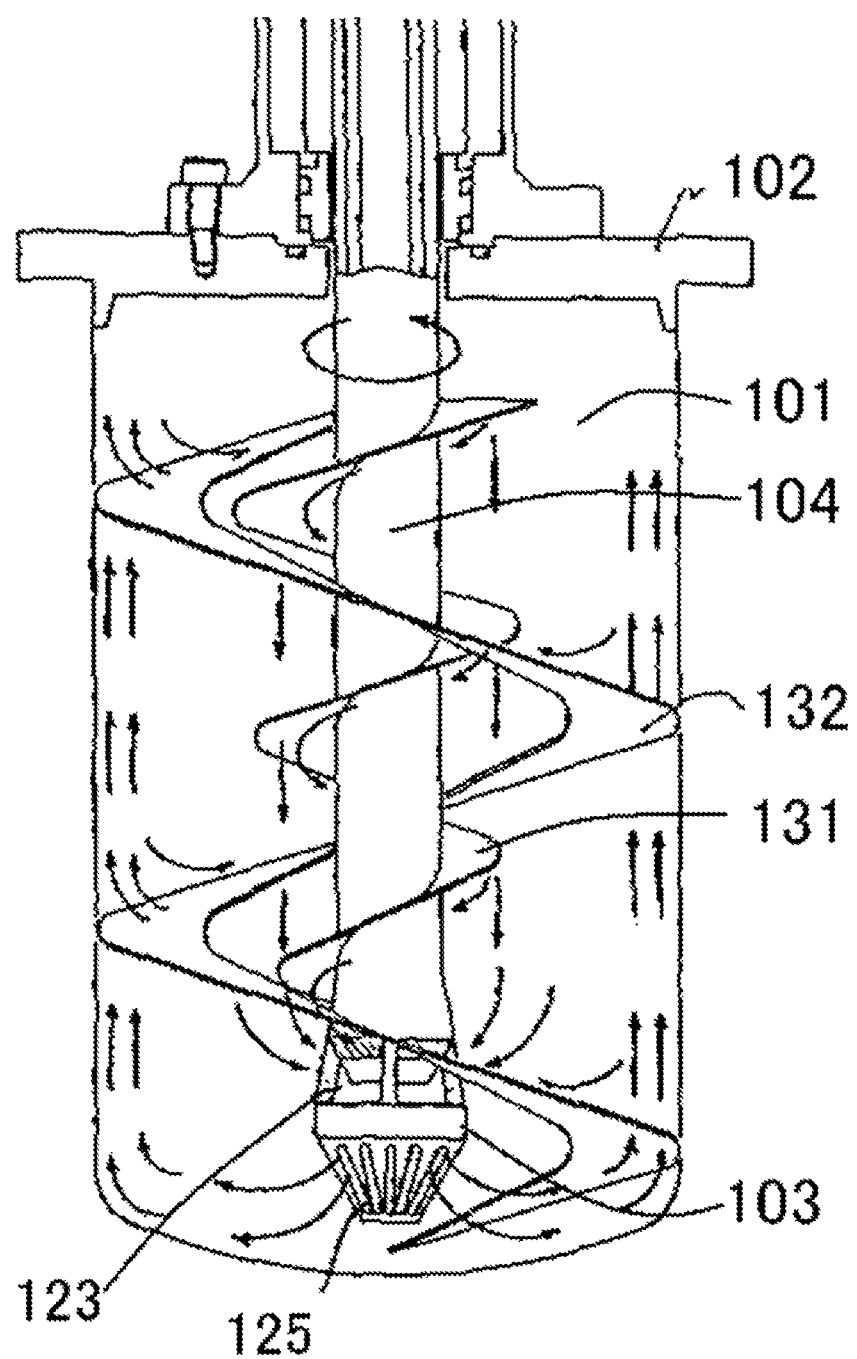
FIG. 4 This shows a front view of the high speed agitator according to the embodiment of the present invention.

As shown in FIG. 4, this high speed agitator is inserted through the cover 102 into the holding tank 101 to hold the fluid to be processed.

Figure 5:
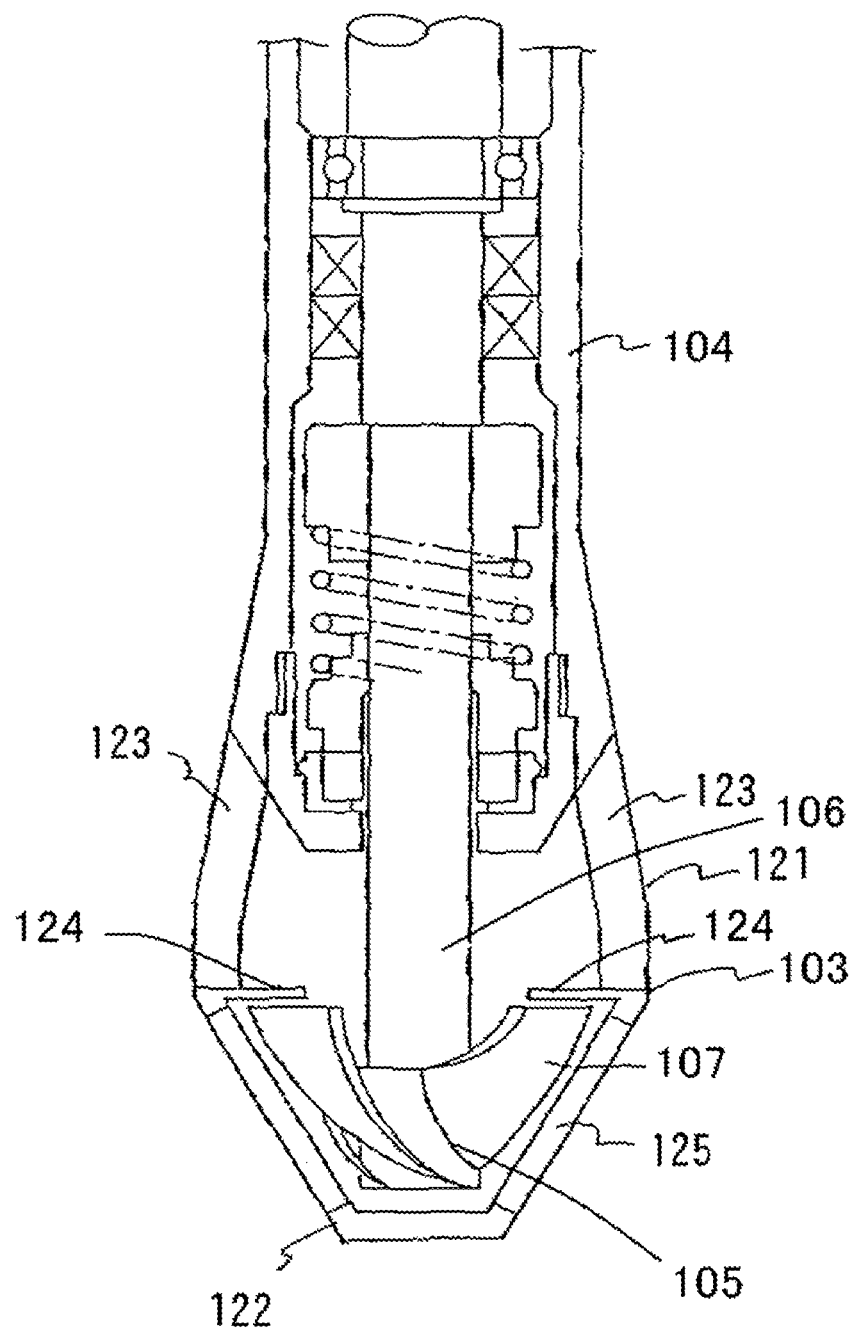
FIG. 5 This shows an explanatory drawing of an internal structure of the said high speed agitator.

As shown in FIG. 5, the high speed agitator is provided with the agitation room 103 and the supporting trunk 104 to support this agitation room 103. Inside the agitation room 103 is accommodated the impeller 105. This impeller 105 is arranged at the front end of the rotation axis 106, and the rotation axis 106 is arranged inside the supporting trunk 104. The rotation axis 106 and the impeller 105 rotate in the reverse direction relative to the supporting trunk 104 and the agitation room 103. The base ends of each of the supporting trunk 104 and the rotation axis 106 are connected to different rotation drive mechanisms (not shown by the figure).

The agitation room 103 is provided with the housing 121 which is arranged at the front end of the supporting trunk 104 and with the screen 122 which is arranged in the front end side of the housing 121. In the housing 121 is formed the admission port 123, and in the screen 122 is formed the discharge port 125. The fluid to be processed is introduced into the agitation room 103 thorough this admission port 123 by rotation of the impeller 105; and then, the fluid to be processed is discharged outside through the discharge port 125 after dispersion, dissolution, and so on. Alternatively, the discharge port 125 may be used as the admission port and the admission port 123 may be used as the discharge port. To compartmentalize between inside the screen 122 and inside the housing 121, the partition 124 may be arranged, though it may not be necessary.

In the above example, the agitation room 103 and the impeller 105 are made to rotate to the opposite directions with each other so that the discharge port 125 rotates to the other direction of rotation of the impeller 105. By so doing, relative rotation numbers between these two can be increased; and as a result, capacity of the shearing treatment of the fluid to be processed may be enhanced. Especially in the very minute space between the inner wall of the screen 122 and the edge of the blade 107 of the impeller 105, a large shearing force is applied to the fluid to be processed.

The present invention is not limited to the above-mentioned embodiment; the screen 122 having the discharge port 125 may be removed, and only the housing 121 having the admission port 123 whereby rotating this housing may be arranged. By removing the screen 122, the fluid to be processed may be dissolved in a short period of time while controlling cavitation without applying the shearing force to the fluid to be processed.

Because either one or both of the admission port 123 and the discharge port 125 arranged in the agitation room 103 rotate as mentioned above, any of admission and discharge or both of the fluid to be processed may sequentially change the positions thereof relative to the fluid to be processed present outside the agitation room 103; and as a result, alienation of the fluid to be processed from the circulation can be prevented from occurring. Alternatively, only the impeller 105 may be rotated nakedly without arranging the agitation room 103.

In order to securely circulate the fluid to be processed entirely in the holding tank 101, the introduction fin 131 which is rolled spirally along the longitudinal direction of the supporting trunk 104 may be arranged. By rotation of this introduction fin 131 together with the supporting trunk 104, the fluid to be processed present in the upper part of the holding tank 101 descends along the outer periphery of the supporting trunk 104 thereby introducing the fluid to be processed to the admission port 123. Alternatively, the circulation fin 132 which is rolled in the opposite direction to the introduction fin 131 may be arranged. This circulation fin 132 is disposed outside the introduction fin 131 so that the fluid to be processed that is discharged from the discharge port 125 is circulated to the upper part of the holding tank 101.

Meanwhile, the high speed agitator shown in FIG. 4 and FIG. 5 is commercialized as the above-mentioned Clearmix Dissolver (manufactured by M. Technique Co., Ltd.).

The circumferential velocity of the agitation blade during the time of dissolving the microparticle raw material into the solvent by using the foregoing high speed agitation is not particularly restricted; but the velocity of 1 or more by m/second is preferable. This velocity may be appropriately chosen in accordance with viscosity and temperature of the solvent, or with the concentration of the microparticle raw material to be dissolved.

Hereinafter, an embodiment of the apparatus to separate the microparticles between at least two processing surfaces which are disposed in a position they are faced with each other so as to be able to approach to and separate from each other, at least one of which rotates relative to the other, will be explained by referring to the figures.

Figure 2:
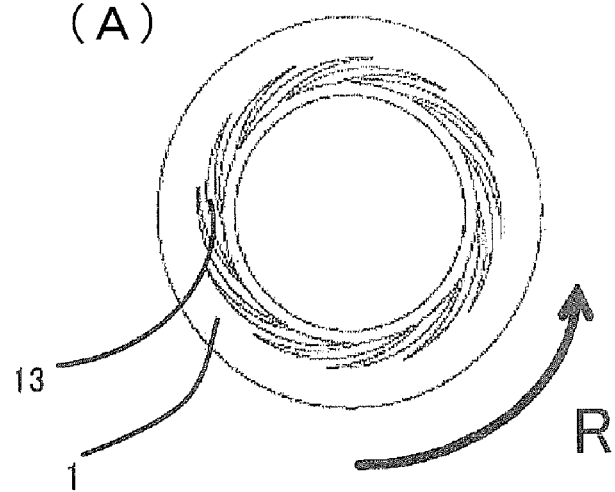
FIG. 2(A) is a schematic plane view of the first processing surface in the fluid processing apparatus shown in FIG. 1.
FIG. 2(B) is an enlarged view showing an important part of the processing surface in the apparatus.
Figure 2:
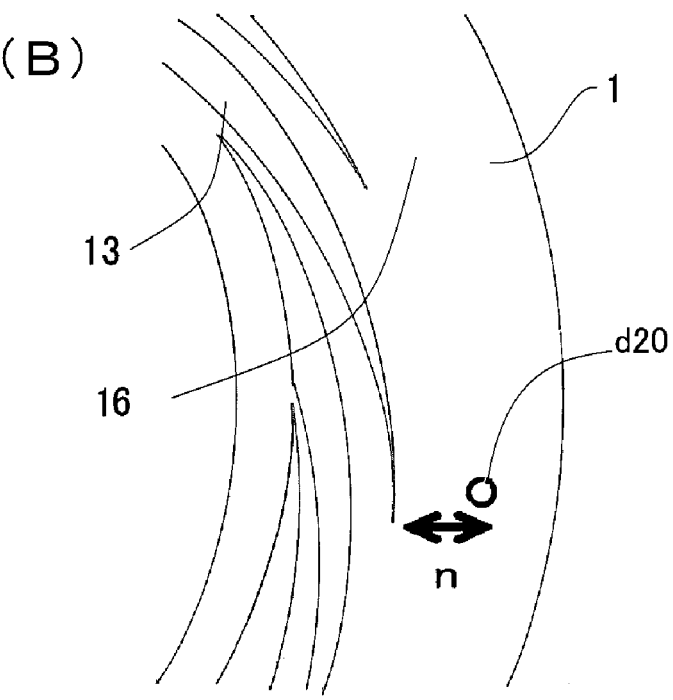
Figure 3:
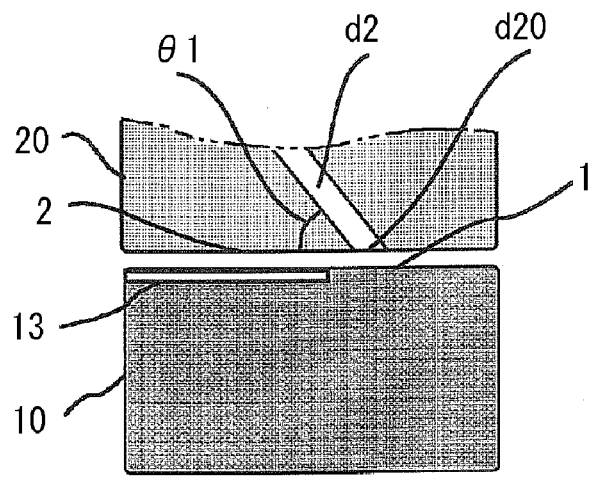
FIG. 3(A) is a sectional view of the second introduction member of the apparatus.
FIG. 3(B) is an enlarged view showing an important part of the processing surface for explaining the second introduction member.
Figure 3:
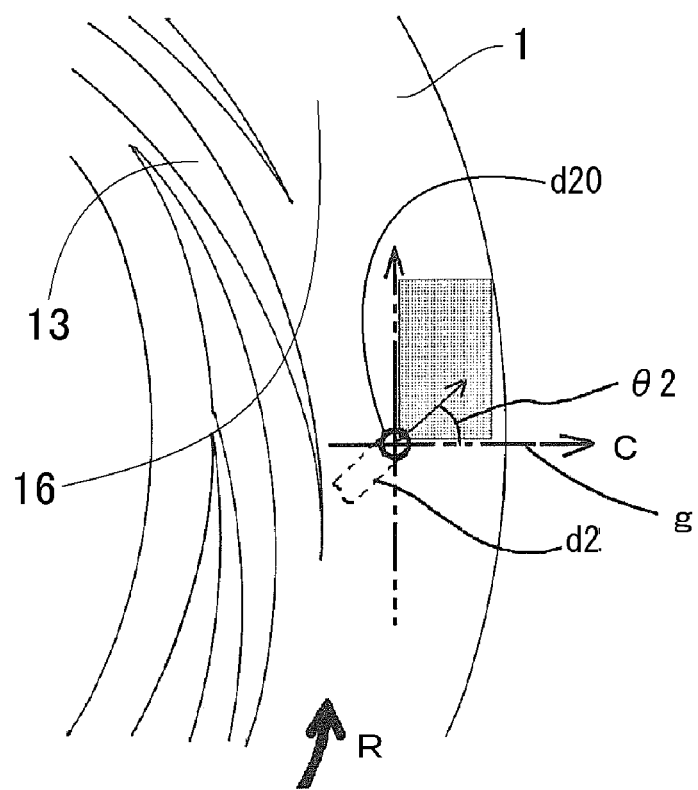

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 µm to 50 µm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a depression for mainly accepting that side of the second processing member 20 opposite to the second processing surface 2, and this depression is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2 under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing a balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is desirable that the base end of this depression 13 reach the internal circumference of the first processing member 10. The front end of the depression 13 is extended toward the outer circumference side of the first processing surface 1, and the depth thereof (cross section area) becomes gradually shallower (smaller) as going from the base end to the front end.

Between the front end of the depression 13 and the outer circumference side of the first processing surface 1 is arranged the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the nanoparticles therefrom be effected under the condition of a laminar flow.

This second introduction part d2 may have directionality. For example, as shown in FIG. 3(A), the direction of introduction from the opening d20 of the second processing surface 2 is inclined at a predetermined elevation angle (θ1) relative to the second processing surface 2. The elevation angle (θ1) is set at more than 0° and less than 90°, and when the reaction speed is high, the angle (θ1) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle (θ2) exists facing the rotation direction R from a reference line g, which is the line to the outward direction and in the radial direction passing through the opening d20. This angle (θ2) is also set preferably at more than 0° and less than 90°.

This angle (θ2) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the apparatus described above, the processing such as separation, precipitation, and crystallization takes place with forced and uniform mixing between the processing surfaces 1 and 2 which are disposed in a position they are faced with each other so as to be able to approach to and separate from each other, at least one of which rotates relative to the other, as shown in FIG. 1. Particle diameter and monodispersity of the substance to be processed that is so processed can be controlled by appropriately adjusting rotation speed of the processing members 10 and 20, flow velocity, distance between the processing surfaces 1 and 2, concentration of the raw material in the fluid to be processed, kind of the solvent for the fluid to be processed, and so on.

Hereinafter, specific embodiments of the method for producing the microparticles by using the apparatus described above will be explained.

In the above-mentioned apparatus, the microparticles are separated by mixing a microparticle raw material solution having at least one microparticle raw material dissolved in a solvent with at least one separating solution in the thin film fluid formed between the processing surfaces which are disposed in a position they are faced with each other so as to be able to approach to and separate from each other, at least one of which rotates relative to the other. For this, preparation of the microparticle raw material solution is done by using a high speed agitation or an ultrasonic wave.

The separation reaction of the microparticles takes place in the forced and uniform mixing between the processing surfaces 1 and 2 which are disposed in a position they are faced with each other so as to be able to approach to and separate from each other, at least one of which rotates relative to the other, in the apparatus shown in FIG. 1 of the present invention.

Firstly, at least one separating solvent is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the microparticle raw material solution having at least one microparticle raw material dissolved in a solvent is introduced as the second fluid from the second introduction part d2, which is another flow path, directly into the first fluid film formed between the processing surfaces 1 and 2.

By so doing, the first fluid and the second fluid are mixed between the processing surfaces 1 and 2 while the distance therebetween is fixed by the pressure balance between the supply pressure of the fluids to be processed and the pressure that is applied between the rotating processing surfaces, thereby effecting the reaction to separate the microparticles.

Meanwhile, it is sufficient if the foregoing reaction can be effected between the processing surfaces 1 and 2; and thus, on contrary to the above, the second fluid may be introduced from the first introduction part d1, and the first fluid may be introduced from the second introduction part d2. In other words, the expression of the first and the second in each fluid merely distinguish the $n^{th}$ fluid among a plurality of fluids used therein; and thus, the third or more fluids may also exist.

Alternatively, as mentioned above, the processing apparatus may be provided with the third introduction part d3, in addition to the first introduction part d1 and the second introduction part d2; and in this case, for example, from the respective introduction parts, each of the first fluid, the second fluid, and the third fluid which is different from the first fluid and the second fluid may be introduced separately into the processing apparatus. By so doing, concentration and pressure of each fluid can be controlled separately so that the separation reaction can be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided.

In addition, temperatures of the fluids to be processed such as the first fluid and the second fluid may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

EXAMPLES

Hereinafter, the present invention will be explained in more detail by Examples; but the present invention is not limited only to these Examples.

Meanwhile, in the following Examples, the term "from the center" means "from the first introduction part d1" of the processing apparatus shown in FIG. 1; the first fluid means the above-mentioned first fluid to be processed which is introduced from the first introduction part d1; and the second fluid means the above-mentioned second fluid to be processed which is introduced from the second introduction part d2 of the processing apparatus shown in FIG. 1.

The ICP emission spectrometric analysis with regard to concentrations (mol concentrations) of zinc (Zn) and germanium (Ge) in the obtained microparticle powder was done by using ICPS-8100 (sequential type, manufactured by Shimadzu Corp.).

TEM observation and EDX measurement were done by using JEM-2100 (manufactured by JEOL Ltd.) to observe the primary particle diameter or to observe and measure the concentrations (mol concentrations) of zinc (Zn) and germanium (Ge) in the primary particle in a plurality of the observation spots for calculation of the element ratio. As to the observation condition in the TEM observation and the EDX measurement, the observation magnification of 250,000 or more was employed; and confirmation of the element ratio was done with the average value of 100 spots.

Examples 1 to 6 and Comparative Examples 1 to 2

In Examples 1 to 6, the separation reaction is carried out by mixing a microparticle raw material solution with a separating solvent in a thin film fluid formed between the processing surfaces 1 and 2 which are disposed in a position they are faced with each other so as to be able to approach to and separate from each other, at least one of which rotates relative to the other, in the apparatus as shown in FIG. 1, wherein the fluids are uniformly dispersed, agitated, and mixed in the said thin film fluid.

While an aqueous ammonia with the concentration thereof being 1% by weight was introduced as the first fluid of the separating solvent from the center with the supply pressure of 0.5 MPa and the back pressure of 0.02 MPa and with the rotation speed of 1500 rpm, the microparticle raw material solution in which zinc nitrate and germanium tetrachloride were dissolved in an ion-exchanged water (this solution contained zinc nitrate with the concentration thereof being 3% by weight and germanium tetrachloride with the concentration thereof being 0.18% by weight—this corresponds to mol ratio of 95 to 5) was introduced as the second fluid into between the processing surfaces 1 and 2. The first fluid and the second fluid were mixed in the thin film fluid; and the fluid thus mixed was discharged from the processing surfaces as the disperse solution of the germanium-doped zinc oxide microparticles in which the germanium-doped zinc oxide microparticles were dispersed as the microparticles. Supply temperatures of the first fluid and the second fluid are shown in Table 1. These respective supply temperatures were measured just before introduction of the first fluid and the second fluid into the processing apparatus (in other words, just before introduction of the respective fluids into between the processing surfaces 1 and 2). To remove impurities from the discharged disperse solution of the germanium-doped zinc oxide microparticles, the germanium-doped zinc oxide microparticles were loosely aggregated, and then, the germanium-doped zinc oxide microparticles were spun down by using a centrifugal separator (×18000 G) for washing; and after the supernatant thereof was removed, the germanium-doped zinc oxide microparticles were redispersed by adding pure water and then spun down again by using the centrifugal separator. This washing operation was repeated for three times; and then, a finally obtained paste of the germanium-doped zinc oxide microparticles was dried at 50° C. under vacuum of −0.1 MPaG. The ICP measurement of the powders of the germanium-doped zinc oxide microparticles thereby obtained was carried out, and the element ratio of zinc to germanium (mol ratio) was calculated. Also from the TEM observation and the EDX measurement of the powders of the germanium-doped zinc oxide microparticles, the element ratio of zinc to germanium (mol ratio) was calculated.

In Examples 1 to 6, the microparticle raw material solution, i. e., the second fluid, was prepared by using Clearmix Dissolver (manufactured by M. Technique Co., Ltd.) as the high speed agitator. Specifically, zinc nitrate and germanium tetrachloride were charged into ion-exchanged water while it was agitated at the circumferential velocity as shown in Table 1 for dissolution by using Clearmix Dissolver.

In Comparative Examples 1 to 2, zinc nitrate and germanium tetrachloride were dissolved into ion-exchanged water by using a stirring bar and a magnetic stirrer. Except for this, other conditions were the same as those of the above-mentioned Examples 1 to 6. In Table 1, the processing conditions and the elemental ratios obtained from the results of the ICP measurement and the TEM-EDX measurement, together with the diameters of the primary particles obtained from the TEM observation, are shown.

In Examples 1 to 6, in which the second fluid prepared by using Clearmix Dissolver was used, it can be seen that there is no discrepancy between the IPC measurement result and the TEM-EDX measurement result. In the ICP measurement, the element ratio in the entire powders of the germanium-doped zinc oxide microparticles is measured; whereas in the TEM-EDX measurement, microparticles are observed and measured in a plurality of observation spots; and thus, it can be seen that the elements contained in the microparticles are unevenly distributed. By comparing these measurement results, it can be appreciated that the microparticles are prepared with more uniform and homogeneous element ratio.

Further, in Examples 1 to 3 and Examples 4 to 6, even if the circumferential velocity of Clearmix Dissolver was changed, the element ratio in the obtained germanium-doped zinc oxide microparticles did not change significantly.

From the particle diameter and the distribution thereof of the prepared microparticles, it can be seen that in Example 1 to 3 the germanium-doped zinc oxide microparticles with smaller particle diameter and narrower particle diameter distribution range than those of Comparative Example 1 were obtained, and that in Example 4 to 6 the germanium-doped zinc oxide microparticles with smaller particle diameter and narrower particle diameter distribution range than those of Comparative Example 2 were obtained.

When comparison is made between Examples 1 to 3 and Examples 4 to 6, when the supply speed of the first fluid was faster, the germanium-doped zinc oxide microparticles with larger particle diameter were obtained.

In addition, in Examples 1 to 3 and Examples 4 to 6, even if the circumferential velocity of Clearmix Dissolver was changed, the obtained germanium-doped zinc oxide microparticles hardly changed the particle diameter thereof.

In view of the above discussion, it can be seen that, when the microparticle raw material solution is prepared by using a high speed agitator, uniform and homogeneous microparticles can be obtained even if the microparticles contained a plurality of elements. In addition, it can be confirmed that particle diameter of the produced microparticles can be controlled.

before introduction of the respective fluids into between the processing surfaces 1 and 2). To remove impurities from the discharged disperse solution of the PV-19 microparticles, the PV-19 microparticles were loosely aggregated, and then, the PV-19 microparticles were spun down by using a centrifugal separator (x18000 G) for washing; and after the supernatant thereof was removed, the PV-19 microparticles were redispersed by adding pure water and then spun down again by using the centrifugal separator. This washing operation was repeated for three times; and then, a finally obtained paste of the PV-19 microparticles was dried at 50° C. under vacuum of −0.1 MPaG. The powders of the obtained PV-19 microparticles were observed with TEM.

In Examples 7 to 8, the microparticle raw material solution, i. e., the second fluid, was prepared by using Clearmix

TABLE 1

| | Second fluid | | | | | First fluid | | | Elemental analysis | | Particle |
| | Preparation equipment | Circumferential speed (m/second) | [Zn:Ge] Kind | [Zn:Ge] (mol) | Supply speed [mL/min] | Supply temp. [° C.] | Kind | Supply speed [mL/min] | Supply temp. [° C.] | [Zn:Ge] (mol) ICP | [Zn:Ge] (mol) TEM-EDX | diameter [nm] TEM |
|---|---|---|---|---|---|---|---|---|---|---|---|---|
| Example 1 | Clearmix | 1.6 | Zinc nitrate | 95:5 | 10 | 25 | 1% by | 50 | 80-100 | 95.3:4.7 | 94.3:5.7 | 5-10 |
| Example 2 | Dissolver | 7.9 | germanium | | | | weight | | | 95.1:4.9 | 96.7:3.3 | 5-10 |
| Example 3 | | 12.6 | tetrachloride | | | | aqueous | | | 94.8:5.2 | 94.4:5.6 | 5-10 |
| Example 4 | Clearmix | 1.6 | aqueous | | | | ammonia | 200 | | 95.2:4.8 | 95.1:4.9 | 20-30 |
| Example 5 | Dissolver | 7.9 | solution | | | | | | | 94.8:5.2 | 96.8:3.2 | 20-30 |
| Example 6 | | 12.6 | | | | | | | | 94.9:5.1 | 94.8:5.2 | 20-30 |
| Comparative Example 1 | Stirring bar/magnetic stirrer | 2.1 | | | | | | 50 | | 94.3:5.7 | 33.6:66.4 | 10-500 |
| Comparative Example 2 | | | | | | | | 200 | | 95.6:4.4 | 62.3:37.7 | 10-200 |

Examples 7 to 8 and Comparative Examples 3 to 4

In Examples 7 to 8, the separation reaction is carried out by mixing a microparticle raw material solution with a separating solvent in a thin film fluid formed between the processing surfaces 1 and 2 which are disposed in a position they are faced with each other so as to be able to approach to and separate from each other, at least one of which rotates relative to the other, in the apparatus as shown in FIG. 1, wherein the fluids are uniformly dispersed, agitated, and mixed in the said thin film fluid.

While methanol was introduced as the first fluid of the separating solvent from the center with the supply pressure of 0.5 MPa and the back pressure of 0.02 MPa and with the rotation speed of 2000 rpm, the microparticle raw material solution in which organic pigment C. I. Pigment Violet 19 (PV-19) was dissolved in concentrated sulfuric acid (pigment concentration of 2% by weight) was introduced as the second fluid into between the processing surfaces. The first fluid and the second fluid were mixed in the thin film fluid; and the disperse solution of PV-19 microparticles in which PV-19 microparticles were dispersed as the microparticles was discharged from the processing surfaces. Supply temperatures of the first fluid and the second fluid are shown in Table 1. These respective supply temperatures were measured just before introduction of the first fluid and the second fluid into the processing apparatus (in other words, just Dissolver (manufactured by M. Technique Co., Ltd.) as the high speed agitator. Specifically, PV-19 was charged into concentrated sulfuric acid while it was agitated at the circumferential velocity as shown in Table 2 for dissolution by using Clearmix Dissolver. In Comparative Examples 3 to 4, PV-19 was dissolved into concentrated sulfuric acid by using a stirring bar and a magnetic stirrer.

Except for this, other conditions were the same as those of the above-mentioned Examples 7 to 8. In Table 2, the processing conditions as well as the particle diameter and the particle forms of the PV-19 microparticles observed with TEM are shown collectively.

When the second fluid prepared by using Clearmix Dissolver was used, spherical microparticles were obtained, whilst when the second fluid prepared by using a stirring bar and a magnetic stirrer was used, particles having an increased particle diameter with a non-spherical form were produced. In addition, when the circumferential speed of Clearmix Dissolver and the supply speed of the second fluid were made faster, it was found that the PV-19 microparticles having a larger particle diameter were obtained so that the particle diameter thereof could be controlled.

In view of the above discussion, it can be seen that, if the microparticle raw material solution is prepared by using a high speed agitator, uniform and homogeneous microparticles can be obtained.

TABLE 2

| | | Second fluid | | | | First fluid | | | TEM observation results | |
|---|---|---|---|---|---|---|---|---|---|---|
| | Preparation equipment | Circumferential speed (m/second) | Kind | Supply speed [mL/min] | Supply temp. [° C.] | Kind | Supply speed [mL/min] | Supply temp. [° C.] | Particle diameter [nm] | Form |
| Example 7 | Clearmix | 4.7 | PV-19 in 98% by weight of conc. Sulfuric acid | 5 | 25 | Methanol | 400 | −35 | 10 | Spherical |
| Example 8 | Dissolver | 14.5 | | 10 | | | | | 20 | Spherical |
| Comparative Example 3 | Stirring bar/magnetic stirrer | 2.6 | | 5 | | | | | Long side 50 × short side 30 | Plate-like |
| Comparative Example 4 | | | | 10 | | | | | Long side 50 × short side 30 | Plate-like |

2 second processing surface
10 first processing member
11 first holder
20 second processing member
21 second holder
d1 first introduction part
d2 second introduction part
d20 opening

The invention claimed is:

1. A method for producing microparticles, comprising the steps of:
   preparing a microparticle raw material solution by dissolving at least one microparticle raw material in a solvent by using a high speed agitator; and
   mixing said microparticle raw material solution with at least one separating solution to separate said microparticle raw material in a thin film fluid formed between at least two processing surfaces, which are disposed in a position facing each other, and operable to approach to and separate from each other, at least one of which rotates relative to the other, thereby separating the microparticles, comprising the sub-steps of:
   passing the separating solution through a first flow path into a space formed between the at least two processing surfaces to form the thin film fluid; and
   passing the microparticle raw material solution through a second flow path into the space formed between the at least two processing surfaces, wherein the second flow path is independent of the first flow path, at least one opening which leads to the second flow path is arranged in at least any one of the at least two processing surfaces, and the microparticle raw material solution is introduced from the opening into the space formed between the at least two processing surfaces; and
   directly controlling an introduction velocity of one of the microparticle raw material solution and the separating solution, which are introduced into the space between the at least two processing surfaces, so as to control a particle diameter of separated microparticles.

2. The method for producing microparticles according to claim 1, wherein a circumferential velocity of an agitating blade during the time of dissolving the microparticle raw material into the solvent by using the high speed agitator is 1 or more m/second.

3. The method for producing microparticles according to claim 1, wherein a particle diameter of the separated microparticles is controlled by preparing the microparticle raw material solution by using the high speed agitator.

4. The method for producing microparticles according to claim 1, wherein the agitator comprises:
   an admission port;
   an agitation room with an impeller accommodated therein; and
   a discharge port,
   wherein the agitation room and the impeller rotate in opposite directions relative to each other, and a minute space is formed between an inner wall of the agitation room and an edge of the blade.

5. The method for producing microparticles according to claim 4, wherein the agitator further includes a tank including an introduction fin and a circulation fin therein that are respectively spirally rolled along a longitudinal direction of a supporting trunk in opposite directions, the circulation fin being disposed outside of the introduction fin so that the fluid that is discharged from the discharge port is circulated to an upper part of the tank.

6. The method for producing microparticles according to claim 1, wherein an introduction velocity of the separating solution is controlled.

7. The method for producing microparticles according to claim 1, wherein an introduction velocity of the microparticle raw material solution is controlled.

8. The method for producing microparticles according to claim 1, further comprising the step of:
   controlling a circumferential velocity of an agitation blade of the agitator to control a particle diameter of separated microparticles.

* * * * *